Aug. 25, 1959  C. H. GARMAGER  2,901,066
CLUTCH
Filed March 21, 1955  4 Sheets-Sheet 1

Inventor:
Curt H. Garmager
By: H. J. Schmid
Atty.

Aug. 25, 1959

C. H. GARMAGER 2,901,066

CLUTCH

Filed March 21, 1955

Inventor:
Curt H. Garmager
By:
W. J. Schmid
Atty.

Aug. 25, 1959

C. H. GARMAGER 2,901,066

CLUTCH

Filed March 21, 1955

Inventor:
Curt H. Garmager
By: W. J. Schmid
Atty

Aug. 25, 1959 C. H. GARMAGER 2,901,066
CLUTCH
Filed March 21, 1955 4 Sheets-Sheet 4
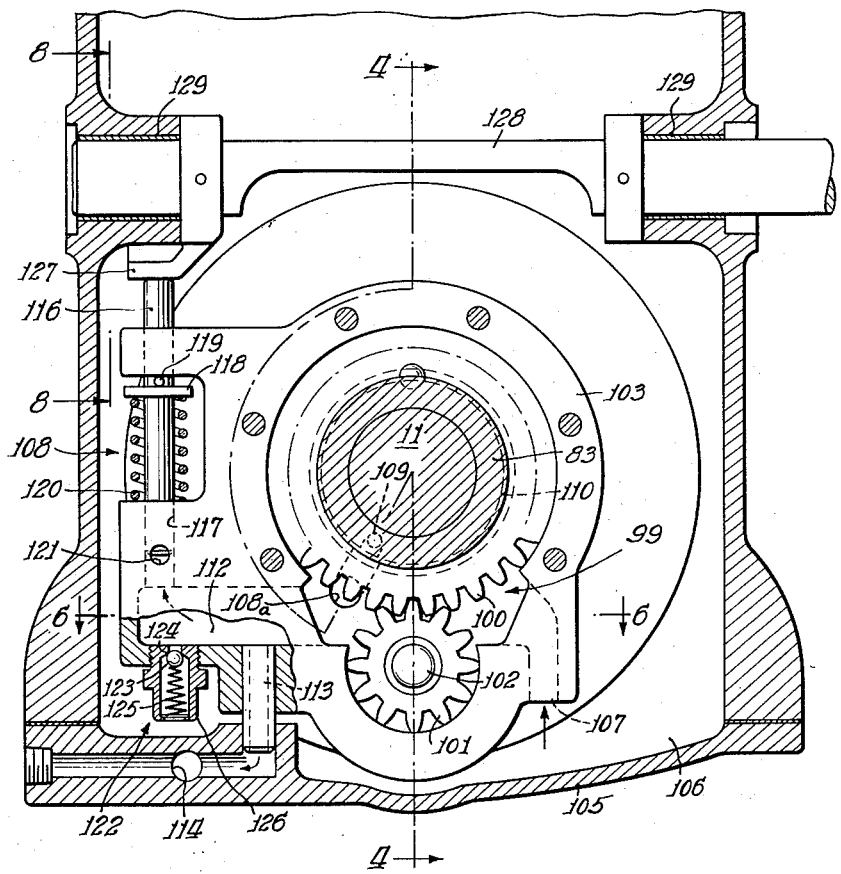
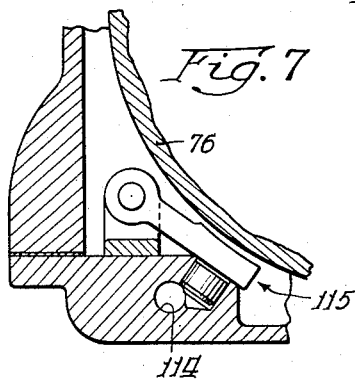
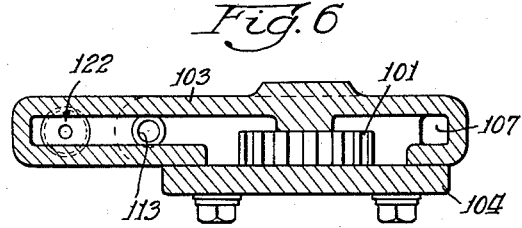
Inventor:
Curt H. Garmager
By:
N. J. Schmid
Atty.

United States Patent Office 2,901,066
Patented Aug. 25, 1959

2,901,066
CLUTCH

Curt H. Garmager, Rockford, Ill., assignor to Borg-Warner Corporation, Chicago, Ill., a corporation of Illinois Application March 21, 1955, Serial No. 495,550

18 Claims. (Cl. 192—17)

The present invention relates to a clutch mechanism and particularly to a clutch mechanism for use in automotive vehicles, such as tractors and trucks.

An object of the invention is to provide an improved clutch mechanism having a large torque transmission capacity and which is smaller and compact to comply with the limited space requirements therefor in automotive vehicles.

A further object of the invention is to provide an improved spring-loaded clutch adapted to be released by hydraulic means.

A still further object of the invention is to provide an improved spring-loaded clutch adapted to be released by hydraulic means, wherein a Belleville type spring washer provides the spring loading of the clutch.

A still further object of the invention is to provide an improved clutch embodying hydraulic controls thereby eliminating the conventional operating mechanical control linkage to the clutch and thus reducing the wearing parts of the clutch and increasing the life thereof.

Further objects and features of the invention will become apparent from the following description and drawings wherein like reference characters refer to like parts and in which:

Figure 5 is a cross-section taken on line 5—5 of Figure 4 looking in the direction of the arrows, and illustrating the hydraulic controls for the clutch;

Figure 6 is a sectional view taken on line 6—6 of Figure 5 looking in the direction of the arrows;

Figure 7 is a partial view taken on line 7—7 of Figure 4 looking in the direction of the arrows, showing some parts in section and illustrating the hydraulic brake control for this embodiment of the clutch.

Figure 1:
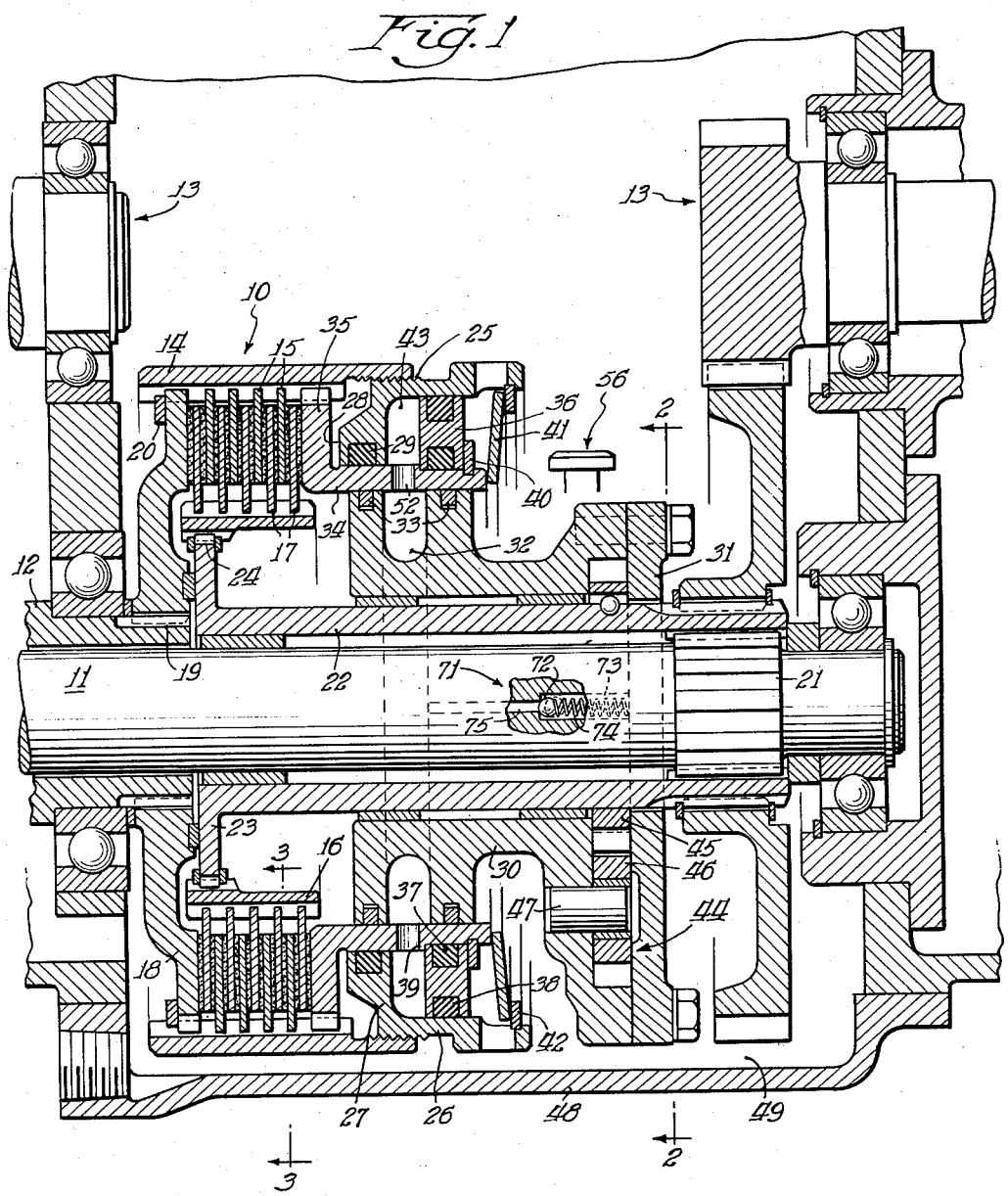
Figure 1 is a longitudinal section through one embodiment of the clutch and showing the clutch in a transmission as one environment thereof.

Referring to the drawings, there is illustrated a clutch generally indicated as 10 and which is employed to connect a drive shaft 11 and a driven quill or sleeve shaft 12 for conjoint rotation. Associated with the drive and driven shafts are drive and driven elements generally indicated as 13.

Figure 2:
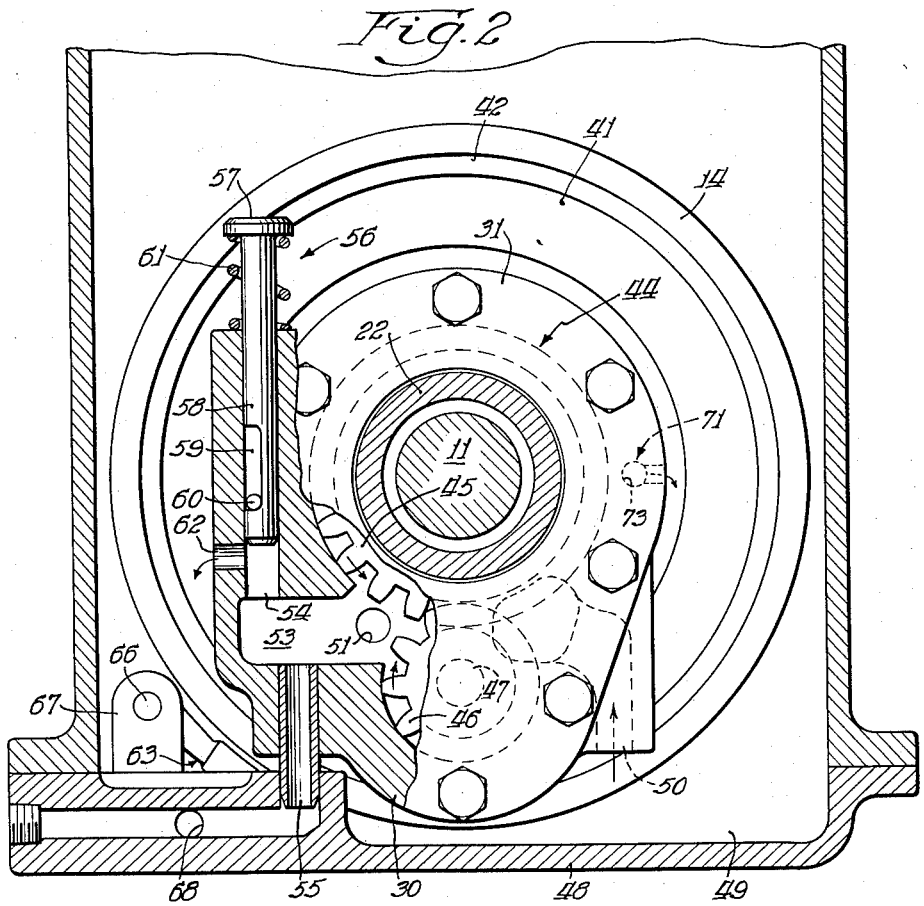
Figure 2 is a cross-section taken on line 2—2 of Figure 1 looking in the direction of the arrows, and illustrating the hydraulic controls for the clutch.
Figure 3:
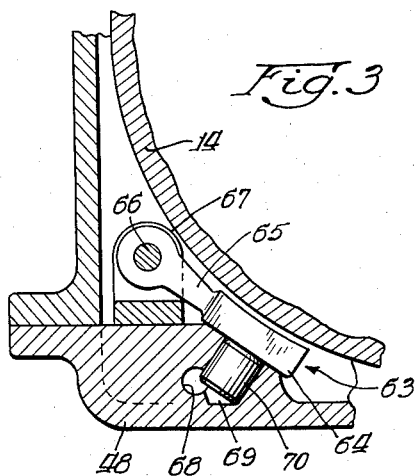
Figure 3 is a partial view taken on line 3—3 of Figure 1 looking in the direction of the arrows, showing some parts in section and illustrating the hydraulic brake control for the clutch.

Referring in particular to Figures 1 to 3, showing one embodiment of the clutch, the clutch 10 comprises an outer cylindrical part or shell 14 having depending therefrom and splined thereto for axial movement a plurality of clutch plates 15 and an inner cylindrical part 16 having splined thereto a plurality of friction plates 17 interleaved with the clutch plates 15, each friction plate 17 being provided with suitable friction facings and adapted to be packed in frictional engagement with the clutch plates 15.

A disc-like member or backing plate 18 is splined or otherwise connected as at 19 to the driven shaft 12 for conjoint rotation therewith and supports the outer cylindrical part or shell 14 of the clutch 10 concentrically with the shafts 11 and 12 and is splined or otherwise connected, as at 20, to the outer cylindrical clutch part or shell 14 so that the cylindrical shell 14 and the splined clutch plates 15 will rotate conjointly with the driven shaft.

The drive shaft 11 and the driven shaft 12 are mounted concentrically for relative rotation and the drive shaft 11 is splined or otherwise connected at 21 to a sleeve member 22 having formed thereon a flange 23 which supports the inner cylindrical clutch part 16 concentrically to the drive shaft 11. The flange 23 and the inner cylindrical clutch part 16 are splined or suitably connected, as at 24. Because of connection 21, the sleeve member 22, flange 23, inner cylindrical clutch part 16 and the friction plates 17 will rotate conjointly with the drive shaft 11.

Screw-threaded or otherwise connected, as at 25, to the outer cylindrical clutch part or shell 14 is a cylindrical member 26 having a flange 27 depending therefrom, the face 28 of which forms a stop for the pressure plate flange 35 which engages the plates of the clutch to pack them in frictional engagement and which will be later described. Carried by the flange 27 is a packing ring 29, the purpose of which will be described.

A housing 30, mounted concentrically to the drive shaft 11 and the sleeve member 22 for relative rotation with respect thereto, and a plate 31, bolted to the housing 30, enclose a pump 44 which will be later described. The housing 30 is formed with a circumferential groove 32 and, at opposite sides of the groove, carries spaced piston rings 33 for engagement with a cylindrical portion of an axially slidable pressure plate 34 formed with an outwardly extending flange 35 which cooperates with the clutch backing plate 18 and friction plates of the clutch 10 to pack them in frictional engagement. A ring member 36 is positioned between the cylindrical portion of the pressure plate and the cylindrical member 26 and carries, on its inner and outer peripheries, packing rings 37 and 38, respectively. The ring member is positioned and engages a reduced portion of the pressure plate 34 providing a shoulder 39 forming a stop, which in cooperation with a lock ring 40, prevents axial movement of the ring member 36 relative to the pressure plate. Bearing against the right end of the cylindrical portion of the pressure plate is a Belleville type spring washer 41 of dished cross-section held in position by means of lock ring 42 fitting in an annular groove in the cylindrical member 26, and positioning the radially inner edge of the washer in contact with the pressure plate 34. The Belleville washer constantly forces the pressure plate to the left, as viewed in Figure 1, and, therefore, yieldably engages the clutch and pressure plates to connect the drive and driven shafts 11 and 12 for conjoint rotation.

Between the flange 27 of the cylindrical member 26 and the ring member 36 is a fluid pressure chamber 43. Fluid pressure supplied to this chamber acts against the ring member 36 to move the pressure plate 34 to the right, as viewed in Figure 1, and, therefore, to disengage the clutch against the force of the Belleville washer.

Fluid pressure is supplied to the pressure chamber 43 by means of a pump, generally indicated by 44, contained in the housing 30 by plate 31. The pump is of a simple intermeshing gear type and comprises a first pump gear 45, mounted on sleeve 22 to rotate with the drive shaft 11, and a second pump gear 46 mounted on a stubshaft 47 journaled in housing 30. The pump gears rotate in the direction of the arrows as shown in Figure 2.

The clutch illustrated is of the wet type and is submerged in oil, or other fluid and the clutch casing 48 forms an oil reservoir or sump 49, and from which oil is withdrawn by the pump to effect the release of the clutch. A fluid intake passage 50 (see Figure 2) is formed in the housing 30 and communicates with the reservoir or sump 49 and pump 44. The pump 44 supplies fluid under pressure to passage 51 formed in the housing 30 which communicates with the groove 32 (Figure 1), previously described, and by means of aperture 52 in the pressure plate 34, to chamber 43, to move the pressure plate to disengage the clutch.

A chamber 53 communicates with passage 51 and also has passages 54 and 55 communicating therewith; the chamber 53 and the passages 54 and 55 are formed in the housing 30. A slidable clutch release valve, generally indicated at 56 is disposed in passage 54 and comprises a headed portion 57, for engagement with suitable mechanism for operating the valve, and an elongated stem portion 58 formed with a slot 59 therein. A pin 60 is fixed to the housing 30 and is disposed in slot 59 in the elongated stem portion 58 of the release valve. The pin 60 holds the valve 56 in place and limits the sliding movement thereof. A coil spring 61 surrounds the valve stem and is disposed between the headed portion 57 and the housing 30 and maintains the release valve 56 in the position shown in Figure 2, when the clutch is engaged. Also, a passage 62 communicates with the sump 49 and the passage 54 as may be seen in Figure 2.

A brake 63 (Figure 3) comprises a brake shoe 64 connected to a lever 65 mounted for pivotal movement on a stub shaft 66 carried by bracket 67 attached to the clutch housing 48. The brake is actuated by fluid pressure flowing through the passage 55 to a communicating passage 68 which is formed in the clutch casing 48 and which communicates with a chamber 69 in which there is disposed piston 70, engaging the brake shoe 64.

To release excessive fluid pressure in the chamber 43, there is provided a relief valve in the housing 30 and generally indicated by 71 which comprises a ball member 72 positioned in a passage 73 communicating with sump 49 and held in position by a coil spring 74 engaging a seat formed by the juncture of passage 72 and a passage 75. The passage 75 communicates with the chamber 43 through aperture 52 in the pressure plate 34 and the groove 32 of the casing 30, as shown in dotted lines in Figure 1.

The clutch is normally engaged by means of the Belleville washer acting against the pressure plate 34 so that the drive and driven shafts, 11 and 12, respectively, are connected for conjoint rotation. Under these conditions, any fluid pressure developed by the pump will be relieved through the passage 62 to the reservoir or sump 49, the valve body 58 being held in its raised position by the spring 61.

When clutch disengagement is desired, the operator of the vehicle, through suitable mechanism, which may be a mechanical linkage or an electrically operated solenoid, causes the release valve body 58 to be depressed, against the action of the spring 61, thus closing off the passage 62. Fluid pressure developed by the pump 44 is then delivered to the passage 51 and thereby to chamber 43 where it acts against ring member 36 to move the pressure plate 34 against the action of the Belleville washer 41 toward the right, as viewed in Figure 1. The travel of the pressure plate 34 is limited by engagement with the face 28 of the flange 27. Packing rings 29, 37 and 38 which are positioned in grooves in members 27 and 36, respectively, maintain the chamber 43 fluid tight, to insure that no leakage of fluid can occur therefrom. Piston rings 33, carried by the member 30, allow the axial sliding motion of the pressure plate 34 to occur.

In addition to the movement of the pressure plate 34, fluid under pressure from pump 44 is also delivered to passage 55 and then to passage 68 where it acts on the piston 70 causing the brake shoe 64 to pivot and engage the outer periphery of the cylindrical part or shell 14 of the clutch so that rotation thereof, and, also rotation of the driven shaft 12, will be stopped for a purpose to be described hereinafter.

When it is then desired to engage the clutch, the operator will allow the release valve 56 to move upwardly to the position shown in Figure 2, by the action of spring 61, and, therefore, pressure in the chamber 53, from the pump 44, will be relieved through the passage 62 to the reservoir or sump 49. The upward movement of the release valve is limited by the pin 60 acting in slot 59. Upon the release of the fluid pressure, the Belleville washer 41 causes the pressure plate 34 to move toward the left, as viewed in Figure 1, causing engagement, and packing, of the clutch and friction plates. Fluid in chamber 43 will drain through the aperture 52 into groove 32, passage 51, chamber 53, passage 55 to the sump.

Particular attention is now directed to Figures 4 to 8, inclusive, of the drawing which shows another embodiment of the clutch.

The clutch comprises an outer cylindrical member or shell 76 having splined thereto for axial movement and depending therefrom, a plurality of clutch plates 77 and an inner cylindrical member 78 having splined thereto a plurality of friction plates 79 interleaved with the clutch plates 77. Each of the friction plates 79 is provided with suitable friction facings and are adapted to be packed in frictional engagement with the clutch plates. The outer cylindrical member or shell 76 is mounted concentrically with the drive and driven shafts 11 and 12, respectively, and is mounted for conjoint rotation with the driven shaft 12 by means of a disc-like member or backing plate 80 which is splined or otherwise connected, as at 81, to the driven shaft 12 and is splined or otherwise connected, as at 82, to the member 76. The inner cylindrical member 78 is a flange extension of a sleeve 83 which is splined or otherwise connected, as at 83a, to the drive shaft 11 so that the sleeve 83, the inner cylindrical member 78 and the friction plates 79 rotate conjointly with the drive shaft 11. As will be noted from an inspection of the drawing, the drive shaft 11 and the driven shaft 12 are mounted concentrically for relative rotation.

Attached to the outer cylindrical clutch part or shell 76 as by threaded connection 84, is a cylindrical member 85 formed with a depending flange 86, the face 87 of which forms a stop for the pressure plate to be described. An axially slidable cylindrical member 88, concentric with the drive shaft and the sleeve 83, is mounted for sliding motion with the respect to the sleeve 83 and carries a radially extending annular pressure plate 89 integral therewith; the plate 89 cooperates with the clutch and friction plates 77 and 79 of the clutch to pack them in frictional engagement. The cylindrical member 88 carries a packing ring 90 which cooperates with the flange member 86, and also a packing ring 91 which cooperates with an annular ring 92 disposed between the cylindrical member 85 and the cylindrical member 88 and is held against movement with respect to the member 88 by a shoulder formed by a reduced portion thereof, indicated at 93, and a lock ring 94. The annular member 92 carries a packing ring 95 between it and the member 85. The function of the packing rings 90, 91 and 95 will be described later.

Bearing against the right end of the member 88 is a Belleville washer 96 having a dished cross-section, which is held in position by a lock ring 97 fitting in a slot in the cylindrical member 85. The Belleville washer forces the pressure plate to the left, as viewed in Figure 4, and therefore maintains the clutch and pressure plates packed in frictional engagement.

The annular space between the flange 86 of the cylindrical member 85 and the ring member 92 forms a fluid pressure chamber 98. Fluid pressure, supplied to this chamber, acts against the ring member 92 to move the pressure plate 89 to the right, as viewed in Figure 4, to disengage the clutch and friction plates against the force of the Belleville washer.

Fluid pressure is supplied to the pressure chamber 98 by means of a pump, generally indicated at 99. The pump 99 is of a simple intermeshing gear type of conventional form and comprises a first pump gear 100, suitably mounted on sleeve 83 for conjoint rotation therewith, and a second pump gear 101 mounted on a stub shaft 102 journaled in the pump housing 103. The pump 99 is retained in the housing by a plate 104 bolted thereto, as may be seen from an inspection of Figure 4. The pump gears rotate in the direction of the arrows as shown in Figure 2.

The clutch is of the wet type and runs in a body of fluid, such as oil, contained in a clutch housing 105 forming a reservoir or sump 106 for the fluid.

Referring to Figure 5, fluid is supplied to the pump from the sump 106 through intake passage 107 and, depending on the position of a release valve generally indicated at 108, will be delivered under pressure to the chamber 98 or returned to the sump 106. Fluid is supplied to the chamber 98 by a conduit 108a formed in the housing 103, which conduit communicates with a passage 109 formed in the sleeve 83 and a continuous annular slot 110 around the periphery of the sleeve 83 to a plurality of radially extending passages 111 formed in the member 88 communicating with the chamber 98 to move member 92 and, through lock ring 94, the pressure plate 89 to the right to disengage the clutch.

Also, when fluid is conducted to the chamber 98, it is also conducted to a chamber 112, through passages 113 and 114 and thence to a brake 115 identical to clutch brake 63 described with reference to Figure 3 and which operates in the same manner so that further description is deemed unnecessary.

The release valve 108 comprises an elongated axially slidable stem 116 slidable in a passage 117 communicating with the chamber 112 and carries a ring 118 engaged by a pin 119 extending through stem 116. A portion of the stem is surrounded by a spring 120 acting against a part of the housing 103 and against the ring 118 to retain the release valve in a raised position so that a passage 121 which communicates with passage 117 remains unblocked for discharge of fluid under pressure from the pump 99 to the sump 106 in the engaged condition of the clutch.

To relieve excessive pressure developed by the pump 99, there is provided a spring-pressed ball type relief valve 122 comprising a ball 123 positioned against a seat 124 by a spring 125 formed in a fixture 126 which is threaded into the casing 103.

The stem 116 of release valve 108 is depressed by the action of a cam 127 fixed to a rotatable shaft 128 retained in bearing members 129 receivable in the housing 105. The shaft 128 may be rotated by any suitable mechanical means or by an electrically operated solenoid connected thereto by suitable linkages.

Normally, the clutch is engaged by means of the Belleville washer and the release valve 108 is held in the position shown in Figure 5 by spring 120. When disengagement of the clutch is desired, the shaft 128 is rotated, thereby rotating the cam 127 which acts on the release valve stem 116 to depress the release valve and close off the passage 121. Fluid under pressure is then conducted from the pump through communicating passages 108a, 109, 110 and 111 to the chamber 98 where it acts against the ring member 92 and against the Belleville washer 96 to disengage the clutch. At the same time, as in the case of the embodiment shown in Figures 1 to 3, fluid pressure is also conducted to the brake there- by holding the outer cylindrical part 76 of the clutch against rotation, and, also the driven shaft 12 against rotation. If the fluid pressure is excessive, the relief valve 122 will allow such excessive pressure to be discharged to the sump 106.

Figure 4:
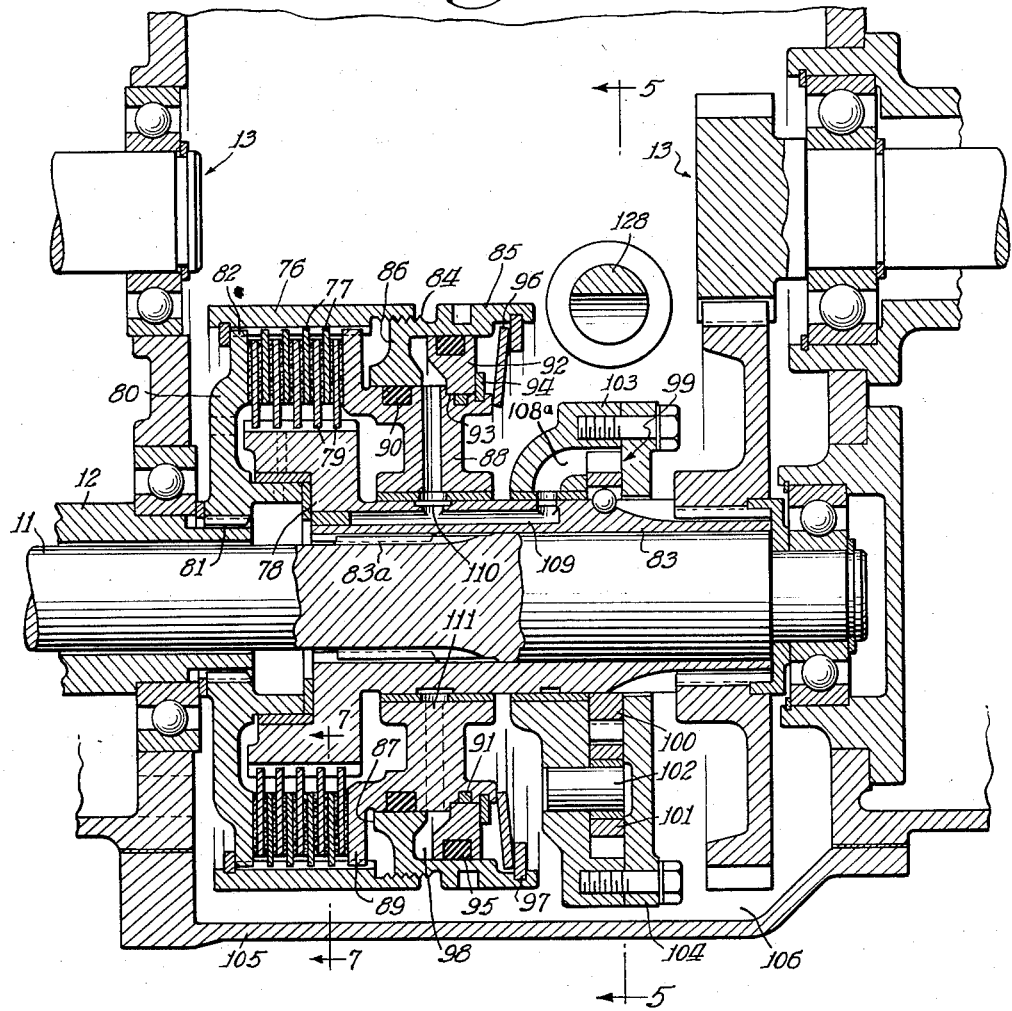
Figure 4 is a sectional view of another embodiment of the clutch and taken on line 4—4 of Figure 5 looking in the direction of the arrows.
Figure 8:
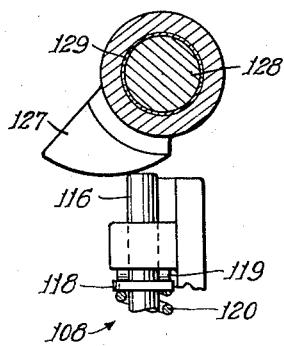
Figure 8 is a view taken on line 8—8 of Figure 5 looking in the direction of the arrows and illustrating the clutch disengaging control.

When it is again desired to have the clutch engaged, the shaft 128 is again rotated to move the cam 127 in the opposite direction thereby allowing the stem of the release valve 108 to move upwardly, due to the action of the spring 120, to open the release passage 121 so that the fluid pressure developed by the pump will be exhausted to the sump. The Belleville washer, due to its spring action, will move the pressure plate back to its clutch-engaging position, as shown in Figure 4, to thereby frictionally pack the clutch and friction plates in frictional engagement.

There are many advantages of using a spring-loaded clutch with hydraulic release, as described herein, instead of the conventional hydraulically engaged and spring-released clutch. For example, if a vehicle is parked on a grade with the engine inoperative, a spring-loaded clutch of the type described will keep the drive and driven shafts coupled indefinitely, to prevent movement of the vehicle whereas a hydraulically engaged clutch will lose engaging hydraulic pressure, due to leakage around seals, etc., causing the clutch to release and allowing the vehicle to coast downgrade. This is also true whenever a drive shaft must sustain a load under static conditions.

It has been found through long experience, that one of the objections to the present day spring-loaded clutch with a mechanical lever system release is the fatigue incurred by the operator as a result of the great number of foot pounds of work required for clutch operation. This is particularly true for heavily loaded clutches where pedal or handle loads are high. By substituting a hydraulic release for the conventional mechanical lever system release, the pedal pressure and stroke can be reduced to as small a load and travel as desired for a particular application.

Hydraulic release is particularly advantageous for use with a high torque clutch installation which is installed in a limited space. A clutch of this type necessitates the use of multiple discs and high unit loading of the plates and thus requires a high total spring pressure. It has not been found practical to utilize a mechanical lever system, having sufficient releasing movement for low pedal pressure and low pedal travel, to release such a clutch due to the limited space allowed. To provide a mechanical lever system having an acceptable pedal pressure and travel require the addition of several plates to such clutch which would occupy more space than would be available, as well as increase the cost, and result in only a small release travel per plate. By utilizing the hydraulic release arrangement as is described herein, the mechanical release lever system is eliminated, also, friction losses in the mechanical release lever system are eliminated, which friction tends to increase considerably with lever wear resulting in excessive pedal pressure. Furthermore, centrifugal force is developed in the release levers, rotating with the clutch, and tends to either engage or release the clutch at high speed. This problem has been eliminated by use of the hydraulic release system as described.

A further advantageous feature of the hydraulic release arrangement over the mechanical lever release devices is that the release bearing, conventionally used with such devices, is eliminated with the attendant thrust loads needed for release as well as the rattle, and wear requiring adjustment of the parts of the devices.

It has also been found that by using a hydraulic release arrangement, as described, for a particular heavy spring type clutch, such as used in trucks, tractors, and the like vehicles, there is little or no need for pedal adjustment, since the pedal may be connected to the hydraulic valve and is not affected by any wear occurring in the clutch plates. In the case of the hydraulic release arrangement desired the Belleville washer produces a constant spring follow-up loading without loss of pressure on the plates.

Thus, it will be apparent that the utilization of the herein described hydraulic release arrangement for a clutch does allow the use of a clutch which will definitely handle more torque in a given restricted space, or alternately, the same torque in less space than is possible with any mechanical linkage or lever type release devices.

The clutch, as illustrated in this application, has eliminated all thrust loads which are usually transferred to the crank shaft bearings and release bearings. This clutch can be either engaged or released with its spring and hydraulic loads self-contained and to provide balanced loading. As a result, it can be placed on a shaft without the benefit of thrust bearings.

The clutch illustrated lends itself to applications where control is to be automatic and function in a cycling system such as transmissions, machine tools, etc. and, since the clutch is a package, it can be bench assembled and bench tested for release and adjustment and shipped as a complete package properly spring loaded and ready for use.

The simple control valve of this invention is designed to give the operator the same feel as a conventional clutch and the control valve meters the fluid flow to control to provide this control.

The oil pump employed is a simple gear pump with one gear made large enough to fit around the drive shaft, therefore providing an inexpensive pump arrangement. The pump consumes horsepower only during clutch release, which is for a short time and at a time when the load is relieved, therefore, not subtracting any useful horsepower when the engine demand is high.

By eliminating mechanical linkage, the wearing parts have been reduced to the clutch plates and, since this is a wet clutch, the wear on the plates is substantially reduced.

The hydraulically actuated brake is incorporated to hold the members stationary during clutch release. This is necessary since the driven members are connected to a constant mesh gear set and gear shifting otherwise would be difficult, due to the oil between the disengaged plates causing rotation to be imparted by one set of plates to the other set of plates to cause a drag effect from the drive shaft in the driven shaft to occur. This is especially true for the clutch illustrated where the plates are submerged in heavy oil, and particularly during use of such clutch at low temperatures.

While certain preferred embodiments of the invention have been specifically disclosed, it is understood that the invention is not limited thereto, as many variations will be readily apparent to those skilled in the art and the invention is to be given its broadest possible interpretation within the terms of the following claims.

I claim:

1. A clutch comprising a first rotatable cylindrical member supporting a clutch plate and a second rotatable cylindrical member supporting a friction plate; an axially movable cylindrical member having a radially extending flange at one end thereof, adapted to pack said plates in frictional engagement; resilient means engaging and acting upon the other end of said axially movable member to move the same toward said plates to hold said plates normally engaged; means forming a fluid pressure chamber operatively associated with said axially movable member for receiving fluid pressure to thereby move said axially movable member, against the force exerted by said resilient means, to disengage said clutch; a third cylindrical member connected to rotate with said first cylindrical member and having a radially extending flange thereon, one face of which forms a stop to engage the flange of said axially movable member to limit the movement of said axially movable member during clutch disengagement and the other face of which forms a wall of said chamber; a ring element fixed with respect to said axially movable member adjacent said other end thereof and having one side providing another wall of said chamber; and means supplying fluid pressure to said chamber to disengage said clutch.

2. A clutch comprising a first rotatable cylindrical member supporting a clutch plate and a second rotatable cylindrical member supporting a friction plate; an axially movable cylindrical member having a radially extending flange at one end thereof, adapted to pack said plates in frictional engagement; resilient means engaging and acting upon the other end of said axially movable member to move the same toward said plates to hold said plates normally engaged; means forming a fluid pressure chamber operatively associated with said axially movable member for receiving fluid pressure to thereby move said axially movable member, against the force exerted by said resilient means, to disengage said clutch; a third cylindrical member connected to said first cylindrical member and having a radially extending flange thereon, one face of which forms a stop to limit the movement of said axially movable member during clutch disengagement and the other face of which forms a wall of said chamber; a ring element fixed with respect to said axially movable member adjacent said other end thereof, having one side providing another wall of said chamber; means supplying fluid pressure to said chamber to move said axially movable member to disengage said clutch, said axially movable member having a passage to communicate fluid pressure to said chamber.

3. A clutch adapted to connect a drive shaft and a driven shaft for conjoint rotation which comprises a first cylindrical member connected to said driven shaft and supporting a clutch plate; a sleeve shaft connected to said drive shaft; a second cylindrical member connected to said sleeve shaft and supporting a friction plate; a stationary cylindrical housing mounted concentrically with respect to said sleeve shaft; an axially movable cylindrical member slidably and rotatably supported by said housing and having a radially extending flange forming a pressure plate at one end thereof rotatable with said first cylindrical member and adapted to pack said plates in frictional engagement and thereby connect said shafts; resilient means engaging and acting upon the other end of said axially movable member to move the same toward said plates to hold said plates normally engaged; means positioned between said flange and said resilient means and forming a fluid pressure chamber operatively associated with said axially movable member for receiving fluid pressure to thereby move said axially movable member, against the force exerted by said resilient means, to disengage said clutch; and means positioned in said housing supplying fluid pressure to said chamber to disengage said clutch.

4. A clutch as defined in claim 3 wherein a third cylindrical member is connected to said first cylindrical member and supports said resilient means and has a radially extending flange thereon, one face of which forms a stop to limit the movement of said axially movable member during clutch disengagement and the other face of which forms a wall of said chamber.

5. A clutch adapted to connect a drive shaft and a driven shaft for conjoint rotation which comprises a first cylindrical member connected to said driven shaft and supporting a clutch plate; a sleeve shaft connected to said drive shaft; a second cylindrical member connected to said sleeve shaft and supporting a friction plate; a stationary cylindrical housing mounted concentrically with respect to said sleeve shaft; an axially movable cylindrical member slidably and rotatably supported by said housing and having a radially extending flange at one end thereof rotatable with said first cylindrical member and adapted to pack said plates in frictional engagement and thereby connect said shafts; resilient means engaging and acting upon the other end of said axially movable member to move the same toward said plates to hold said plates normally engaged; means positioned between said flange and said resilient means and forming a fluid pressure chamber operatively associated with said axially movable member for receiving fluid pressure to thereby move said axially movable member, against the force exerted by said resilient means, to disengage said clutch; a third cylindrical member connected to said first cylindrical member and supporting said resilient means and having a radially extending flange thereon, one face of which forms a stop to limit the movement of said axially movable member during clutch disengagement and the other face of which forms a wall of said chamber; a ring element fixed with respect to said axially movable member adjacent said other end thereof, one face of which forms a movable wall of said chamber operative to move said axially movable member to disengage said plates upon the application of fluid pressure into said chamber; and means positioned in said housing supplying fluid pressure to said chamber to move said ring element and thereby said axially movable member to disengage said clutch.

6. A clutch as defined in claim 5 wherein communicating passages are formed in said axially movable member and said housing to communicate fluid under pressure from said fluid pressure-supplying means to said chamber.

7. A clutch as defined in claim 5 wherein said third cylindrical member is formed with a groove, wherein a lock ring is received in said groove and wherein said resilient means comprises a Belleville spring washer fixed in engaging position by said lock ring.

8. A clutch adapted to connect a drive shaft and a driven shaft for conjoint rotation which comprises a first cylindrical member connected to said driven shaft and supporting a clutch plate; a sleeve shaft connected to said drive shaft; a second cylindrical member connected to said sleeve shaft and supporting a friction plate; an axially movable cylindrical member mounted concentrically to and slidably supported by said sleeve shaft and having a radially extending flange at one end thereof rotatable with said first cylindrical member and adapted to pack said plates in frictional engagement and thereby connect said shafts; resilient means engaging and acting upon the other end of said axially movable member to move the same toward said plates to hold said plates normally engaged; means positioned between said flange and said resilient means and forming a fluid pressure chamber operatively associated with said axially movable member for receiving fluid pressure to thereby move said axially movable member, against the force exerted by said resilient means, to disengage said clutch; a stationary housing mounted concentrically with respect to said sleeve shaft and in axially spaced relation to said axially movable member; and means positioned in said housing supplying fluid to said chamber to disengage said clutch.

9. A clutch as defined in claim 8 wherein a third cylindrical member is connected to said first cylindrical member and supports said resilient means and has a radially extending flange thereon, one face of which forms a stop to limit the movement of said axially movable member during clutch disengagement and the other face of which forms a wall of said chamber.

10. A clutch adapted to connect a drive shaft and a driven shaft for conjoint rotation which comprises a first cylindrical member connected to said driven shaft and supporting a clutch plate; a sleeve shaft connected to said drive shaft; a second cylindrical member connected to said sleeve shaft and supporting a friction plate; an axially movable cylindrical member mounted concentrically to and slidably supported by said sleeve shaft and having a radially extending flange at one end thereof rotatable with said first cylindrical member and adapted to pack said plates in frictional engagement and thereby connect said shafts; resilient means engaging and acting upon the other end of said axially movable member to move the same toward said plates to hold said plates normally engaged; means forming a fluid pressure chamber operatively associated with said axially movable member for receiving fluid pressure to thereby move said axially movable member, against the force exerted by said resilient means, to disengage said clutch; a third cylindrical member connected to said first cylindrical member and supporting said resilient means and having a radially extending flange thereon, one face of which forms a stop to limit the movement of said axially movable member during clutch disengagement and the other face of which forms a wall of said chamber; a ring element fixed with respect to said axially movable member adjacent said end thereof, one face of which forms a movable wall of said chamber operative to move said axially movable member to disengage said plates upon the application of fluid pressure into said fluid chamber; a stationary housing mounted concentrically with respect to said sleeve shaft and in axially spaced relation to said axially movable member; and means positioned in said housing supplying fluid to said chamber to move said ring element and thereby said axially movable member to disengage said clutch.

11. A clutch as defined in claim 10 wherein communicating passages are formed in said axially movable member, said sleeve shaft and said housing to communicate fluid under pressure from said last-named means to said chamber.

12. A clutch as defined in claim 10 wherein communicating passages are formed in said axially movable member, said sleeve shaft and said housing to communicate fluid under pressure from said last-named means to said chamber wherein said third cylindrical member is formed with a groove, wherein a lock ring is received in said groove and wherein said resilient means comprises a Belleville spring washer fixed in engaging position by means of said lock ring.

13. A clutch adapted to connect a drive shaft and a driven shaft for conjoint rotation which comprises a means connected to one of said shafts and supporting a plurality of clutch plates; means connected to the other of said shafts and supporting a plurality of friction plates, an axially slidable pressure plate adapted to pack said clutch and friction plates in frictional engagement thereby engaging said clutch and connecting said shafts; resilient means engaging and acting upon said pressure plate to hold said clutch normally engaged; means forming a fluid pressure chamber operatively associated with said pressure plate for receiving fluid pressure to thereby move said pressure plate, against the force exerted by said resilient means, to disengage said clutch; means for holding said first-named support against rotation during disengagement of said clutch; and means supplying fluid pressure to said chamber to disengage said clutch, said last-named means comprising an intermeshing type gear pump one of the gears of which is driven by one of said shafts.

14. A clutch adapted to connect a drive shaft and a driven shaft for conjoint rotation which comprises means connected to one of said shafts and supporting a plurality of clutch plates; means connected to the other of said shafts and supporting a plurality of friction plates and an axially slidable pressure plate adapted to pack said clutch and friction plates in frictional engagement thereby engaging said clutch and connecting said shafts; resilient means engaging and acting upon said pressure plate to hold said clutch normally engaged; means forming a fluid pressure chamber operatively associated with said pressure plate for receiving fluid pressure to thereby move said pressure plate, against the force exerted by said resilient means, to disengage said clutch; means for holding said first-named support against rotation during disengagement of said clutch; means supplying fluid pressure to said chamber to disengage said clutch, and means controlling the supply of fluid pressure to said chamber comprising a valve having a slidable valve member.

15. A clutch adapted to connect a drive shaft and a driven shaft for conjoint rotation comprising a housing connected to said driven shaft and supporting a plurality of clutch plates, an elongated sleeve fixedly connected to said drive shaft and having a plurality of friction plates interleaved with said clutch plates, an axially slidable member having a radially outwardly extending pressure plate formed integrally therewith, a cylindrical member having an inwardly extending flange, said cylindrical member being affixed to said housing, a ring affixed to said axially slidable member which cooperates with the flange of said cylindrical member to define a pressure chamber, a hydraulic pump mounted in sourrounding relation to said sleeve, said pump having a gear drivingly connected to said drive shaft, an axially extending fluid passage in said sleeve, means affording communication between said passage and said pressure chamber, spring means normally urging said clutch plates and said friction plates into engagement, said axially slidable member being movable axially under the influence of fluid pressure in said pressure chamber to disengage said friction plates from said clutch plates against the force of said spring means, and brake means operable to engage said housing to stop rotation of said driven member upon disengagement of said clutch plates and said friction plates.

16. A clutch adapted to connect a drive shaft and a driven shaft for conjoint comprising a driven member having a plurality of radially extending clutch plates, a driving sleeve fixedly connected to said drive shaft, a plurality of friction plates connected to said driving sleeve and interleaved with said clutch plates, an axially slidable member having a pressure plate formed integrally therewith, spring means normally urging said axially slidable member into a position in which said friction plates are in engagement with said clutch plates, hydraulic means for urging said friction plates out of engagement with said clutch plates against the force of said spring means, said hydraulic means including a hydraulic pump mounted in surrounding relation to said sleeve and having a pair of intermeshing gears one of which being drivingly connected to said sleeve; means forming a pressure chamber, said last-named means including a cylindrical member affixed to said housing and having an inwardly extending radial flange and a ring affixed to said axially slidable member, means including an axial passage in said sleeve and one or more radial passages in said axially slidable member to afford communication between the outlet of said pump and said pressure chamber, means for controlling the pressure of said fluid, said last-named means including a manually actuatable valve having an elongated valve body normally biased into a position in which the fluid pressure is returned to the inlet of said pump, cam means for moving said valve body into another position in which fluid pressure is fed to said pressure chamber, means for releasing said fluid when a predetermined pressure is reached, and brake means adapted to engage said housing to stop rotation of said driven shaft upon disengagement of said clutch, said brake means being actuatable by pressure fluid when disengagement of said clutch is initiated.

17. A clutch adapted to connect a drive shaft and a driven shaft for conjoint comprising a driven member having a plurality of radially extending clutch plates, a driving sleeve fixedly connected to said drive shaft, a plurality of friction plates connected to said driving sleeve and interleaved with said clutch plates, an axially slidable member having a pressure plate formed integrally therewith, spring means normally urging said axially slidable member into a position in which said friction plates are in engagement which said clutch plates, hydraulic means for uging said friction plates out of engagement with said clutch plates against the force of said spring means, said hydaulic means including a hydraulic pump mounted in surrounding relation to said sleeve and having a pair of inter-meshing gears one of which being drivingly connected to said sleeve; means forming a pressure chamber, said last-named means including a cylindrical member affixed to said housing and having an inwardly extending radial flange and a ring affixed to said axially slidable member, means including an axial passage in said sleeve and one or more radial passages in said axially slidable member to afford communication between the outlet of said pump and said pressure chamber, means for controlling the pressure of said fluid, said last-named means including a manually actuatable valve having an elongated valve body normally biased into a position in which the fluid pressure is returned to the inlet of said pump, cam means for moving said valve body into another position in which fluid pressure is fed to said pressure chamber, means for releasing said fluid when a predetermined pressure is reached, means limiting the movement of said axially slidable member under the influence of fluid pressure, said last-named means comprising the confronting face of the flange of said cylindrical member, and brake means adapted to engage said housing to stop rotation of said driven shaft upon disengagement of said clutch, said brake means being actuatable by pressure fluid when disengagement of said clutch is initiated.

18. A clutch comprising a first rotatable cylindrical member supporting a clutch plate and a second rotatable cylindrical member supporting a friction plate; an axially movable cylindrical member having a radially extending flange at one end thereof and a reduced portion at the other end thereof forming a shoulder, a peripheral groove formed in said reduced portion, said flange being adapted to pack said plates in frictional engagement; resilient means engaging and acting upon the other end of said axially movable member to move the same toward said plates to hold said plates normally engaged; means forming a fluid pressure chamber operatively associated with said axially movable member for receiving fluid pressure to thereby move said axially movable member, against the force exerted by said resilient means, to disengage said clutch; a third cylindrical member connected to said first cylindrical member and having a radially extending flange thereon, one face of which forms a stop to limit the movement of said axially movable member during clutch disengagement and the other face of which forms a wall of said chamber, said third cylindrical member having a groove, said resilient means comprising a spring washer of Belleville type, a lock ring received in the groove of said third cylindrical member for retaining said spring washer in operative position; a ring element mounted on the reduced portion of said axially movable member, a lock ring received in the groove of said axially movable member to retain said ring element in abutment with said shoulder, said ring element having one side providing another wall of said chamber; means supplying fluid pressure to said chamber to actuate said axially movable member to disengage said clutch, said axially movable member having a passage to communicate fluid pressure to said chamber.

References Cited in the file of this patent

UNITED STATES PATENTS

| Re. 20,565 | Staude | Nov. 30, 1937 |
| 2,399,097 | Carnagua | Apr. 23, 1946 |
| 2,596,367 | Browne | May 13, 1952 |
| 2,669,330 | Banker | Feb. 16, 1954 |
| 2,709,926 | Jandasek | June 7, 1955 |
| 2,775,331 | Peterson | Dec. 25, 1956 |

FOREIGN PATENTS

| 765,330 | France | Mar. 19, 1934 |
| 927,421 | France | May 5, 1947 |